Patented Feb. 19, 1929.

1,702,391

UNITED STATES PATENT OFFICE.

JACOB L. PRICE, OF NEW YORK, N. Y., ASSIGNOR TO BENDIX BRAKE COMPANY, OF CHICAGO, ILLINOIS, A CORPORATION OF ILLINOIS.

BRAKE DRUM.

Application filed April 2, 1927. Serial No. 180,386.

This invention relates to brake drums and the object of the invention is to provide a brake drum with heat radiating fins, the drum and the heat radiating fins portion being adapted to be manufactured separately and assembled.

Another object of my invention is to provide a heat radiating section for a brake drum of such size and shape that it may be readily mounted upon the brake drum.

Figure 1:
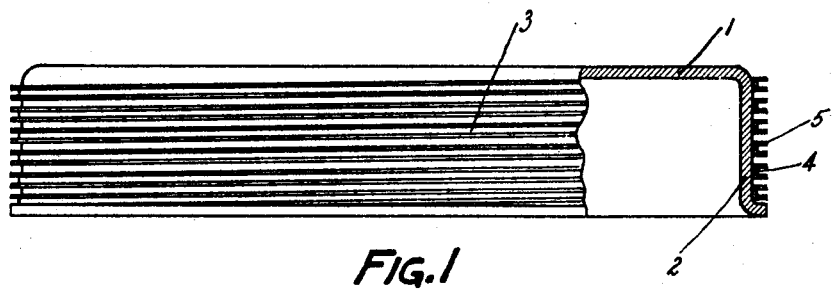
Figure 2:
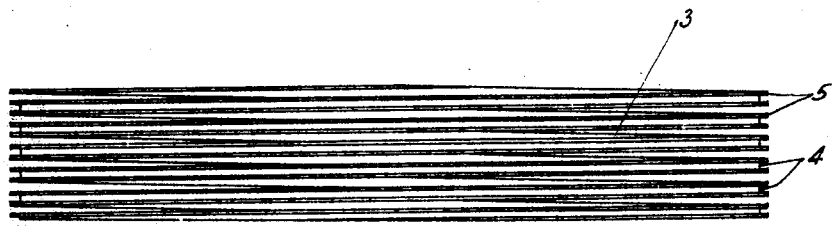

I attain the above, and other objects of the invention which will be apparent as the description proceeds, by means of the construction shown in the accompanying drawing, in which Figure 1 is a top plan view of a brake drum provided with heat radiating means according to this invention, partly broken away; and Figure 2 is a heat radiating fin section before its attachment to the brake drum.

On the drawings, in which like reference characters indicate like parts on all the figures thereof, 1 indicates a brake drum provided with a braking flange 2, and 3 indicates the heat radiating fin section. The drum may be pressed from sheet metal in the usual way.

The fin section is formed from material angular in cross section and is wound helically, thus forming a continuous attaching flange 4 and continuous heat radiating flanges 5. While the material is shown on the drawings as of channel-form, it is obvious that it may be of any desired angular formation, since it is only necessary that there be an attaching flange and a heat radiating flange.

The heat radiating section is attached to the brake drum with one continuous flange spot or line welded, or otherwise secured, to the drum flange.

The method of forming the brake drum and providing it with heat radiating flanges is not claimed herein, since it constitutes the subject matter of my copending application Ser. No. 46,505, filed July 27, 1925.

While one particular drum flange and one particular form of heat radiating element is described and shown herein, it is not my intention to limit the scope of the invention otherwise than by the terms of the appended claims.

I claim:

1. A heat radiating fin for a brake drum consisting of a helically wound element channel shaped in cross section.

2. A preformed heat radiating means for a substantially cylindrical brake drum, said means comprising a helically wound element having one continuous face conforming to the outline of the brake drum on which it is to be mounted and another continuous face extending outwardly at at angle to the first named face to form heat radiating fins.

3. A preformed heat radiating means for a substantially cylindrical braking flange comprising a continuous helically wound element having an outwardly extending heat radiating flange.

In testimony whereof I have hereunto signed my name.

JACOB L. PRICE.